United States Patent
LeVan (10) Patent No.: US 9,048,884 B2
(45) Date of Patent: Jun. 2, 2015

(54) MAGNETIC BASED SHORT RANGE COMMUNICATIONS DEVICE, SYSTEM AND METHOD

(75) Inventor: David O. LeVan, Manlius, NY (US)

(73) Assignee: Lockheed Martin Corporation, Bethesda, MD (US)

(*) Notice: Subject to any disclaimer, the term of this patent is extended or adjusted under 35 U.S.C. 154(b) by 1109 days.

(21) Appl. No.: 12/114,345

(22) Filed: May 2, 2008

(65) Prior Publication Data

US 2009/0275282 A1 Nov. 5, 2009

(51) Int. Cl.
*H04B 5/00* (2006.01)
*H04W 84/12* (2009.01)
*H04W 88/02* (2009.01)

(52) U.S. Cl.
CPC ............ *H04B 5/0081* (2013.01); *H04B 5/0031* (2013.01); *H04W 84/12* (2013.01); *H04W 88/02* (2013.01)

(58) Field of Classification Search
USPC ........................... 455/26.1, 41, 41.1, 41.2, 42
See application file for complete search history.

(56) References Cited

U.S. PATENT DOCUMENTS

| | | | |
|---|---|---|---|
| 5,771,438 A | 6/1998 | Palermo et al. | |
| 5,912,925 A | 6/1999 | Palermo et al. | |
| 5,982,764 A | 11/1999 | Palermo et al. | |
| 6,459,882 B1 | 10/2002 | Palermo et al. | |
| 6,925,052 B1* | 8/2005 | Reynolds et al. | 370/217 |
| 7,035,608 B2 | 4/2006 | Palermo et al. | |
| 7,142,811 B2 | 11/2006 | Terranova et al. | |
| 7,215,924 B2 | 5/2007 | Palermo et al. | |
| 7,236,741 B2 | 6/2007 | Palermo et al. | |
| 7,254,366 B2 | 8/2007 | Palermo et al. | |
| 2002/0132585 A1* | 9/2002 | Palermo et al. | 455/41 |
| 2004/0161967 A1* | 8/2004 | Tsai | 439/502 |
| 2004/0266382 A1* | 12/2004 | Lindstedt | 455/252.1 |
| 2005/0278119 A1* | 12/2005 | Zimmerman et al. | 701/213 |
| 2006/0286931 A1* | 12/2006 | Rhodes et al. | 455/40 |
| 2007/0030116 A1* | 2/2007 | Feher | 340/5.53 |
| 2007/0171997 A1* | 7/2007 | Weissman et al. | 375/297 |
| 2008/0076572 A1* | 3/2008 | Nguyen et al. | 463/42 |
| 2008/0125058 A1* | 5/2008 | Rofougaran | 455/74 |
| 2008/0159364 A1* | 7/2008 | Rofougaran | 375/219 |
| 2008/0231537 A1* | 9/2008 | Rofougaran et al. | 343/850 |

FOREIGN PATENT DOCUMENTS

WO   WO 2008/039676 A2   4/2008

* cited by examiner

*Primary Examiner* — Yuwen Pan
*Assistant Examiner* — Fatuma Sherif
(74) *Attorney, Agent, or Firm* — Howard IP Law Group, PC (57) ABSTRACT

A wireless local area network magnetic communications system comprising a plurality of portable interdependent satellite magnetic transceivers each connected to a respective computer module enclosed in a chassis, wherein a base system containing a magnetic transceiver communicates with the satellite transceivers having associated antennas for transmitting and receiving magnetic signals via a wireless network protocol.

20 Claims, 8 Drawing Sheets

MAGNETIC BASED SHORT RANGE COMMUNICATIONS DEVICE, SYSTEM AND METHOD

FIELD OF THE INVENTION

This invention relates generally to communications systems and more particularly to communications based on magnetic transmission and reception.

BACKGROUND OF THE INVENTION

Near-field magnetic wireless communications utilize non-propagating magnetic induction to create magnetic fields for transmitting and receiving as opposed to conventional radio frequency (RF) communications that create time varying electric fields. Other distinctions include the fact that magnetic induction creates a field constrained to a three dimensional geometry (typically sphere-like) approximately 1 to 3 meters in diameter. RF fields are virtually unbounded, tending to decrease in intensity as the square of the distance from the transmitting antenna. In contrast, magnetic fields decrease as the cube of the distance from the transmitting antenna in typical media such as air, vacuum, and the like. Furthermore, magnetic wireless communication does not suffer from the nulls and fades or interference or that often accompanies RF communications.

The foregoing characteristics of magnetic communications provide for a level of security that conventional RF systems do not provide. An RF system allows anyone with a receiver capable of tuning into the bandwidth to theoretically tap into the transmission because RF systems transmit well beyond physical boundaries established by most enclosures. The exception is when enclosures are designed to contain the RF, such as specially constructed screen rooms. On the other hand, magnetic communications retain transmission/reception reliability in the presence of most physical obstacles. It is therefore desirable to exploit features of magnetic communications to create short range wireless communications for devices such as headphone connections to personal listening devices, data transfer within vehicles, such as automobiles, ships, aircraft, tanks, and inside space borne satellites where the wireless signal must remain contained in a vicinity for added security. It is desirable to create and produce a high speed communication system for short-range wireless local area network (WLAN) applications.

SUMMARY OF THE INVENTION

A wireless local area network magnetic communications system comprising a plurality of portable interdependent satellite magnetic transceivers each connected to a respective computer module enclosed in a chassis, wherein a base system containing a magnetic transceiver communicates with the satellite transceivers having associated antennas for transmitting and receiving magnetic signals via a wireless network protocol.

BRIEF DESCRIPTION OF THE DRAWINGS

Understanding of the present invention will be facilitated by consideration of the following detailed description of the preferred embodiments of the present invention taken in conjunction with the accompanying drawings, in which like numerals refer to like parts and.

DETAILED DESCRIPTION OF THE PREFERRED EMBODIMENTS

The following description of the preferred embodiments is merely by way of example and is in no way intended to limit the invention, its applications, or uses.

Figure 1:
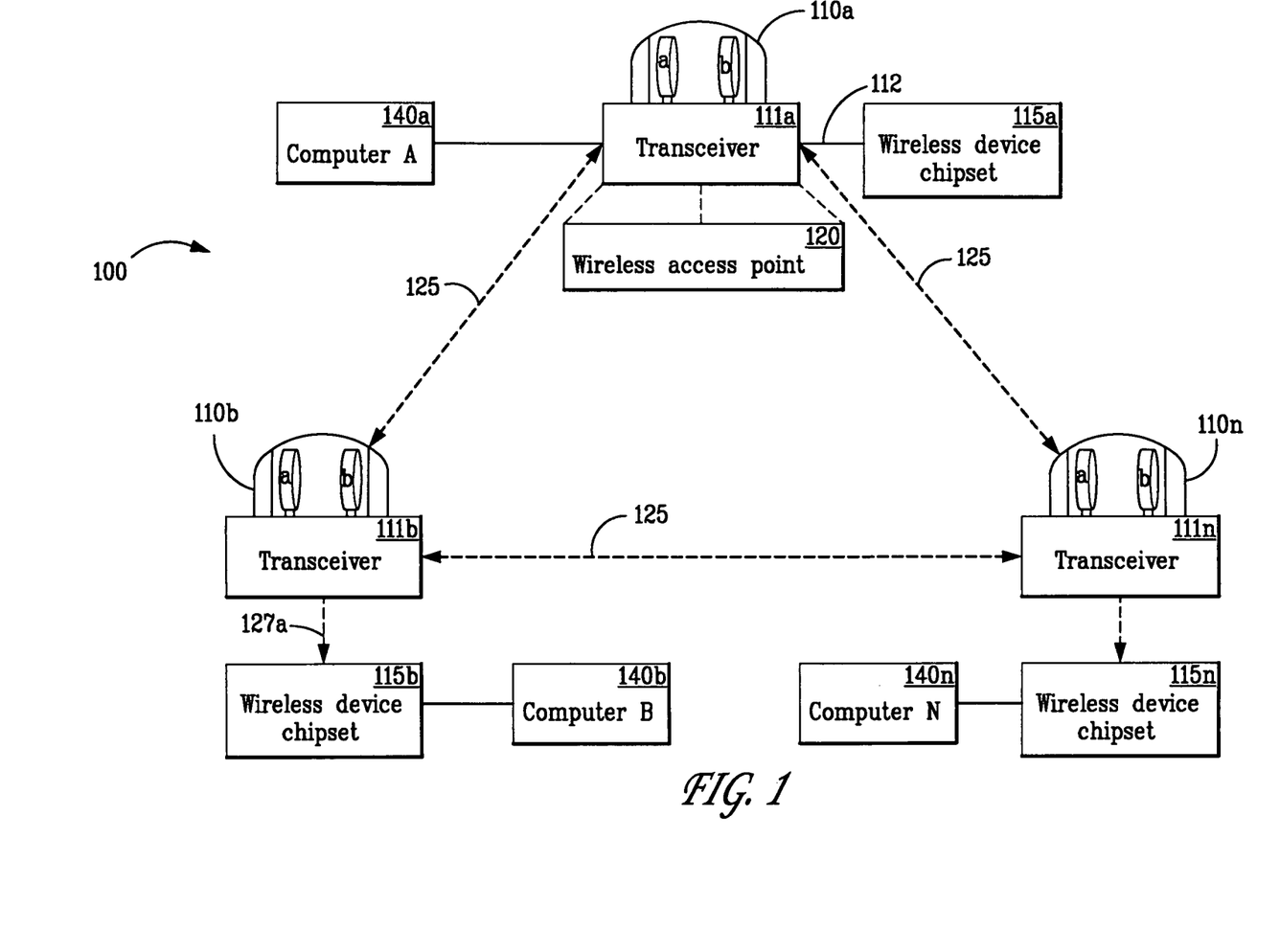
FIG. 1 illustrates a diagram of a system according to an embodiment of the invention.

FIG. 1 is a diagram of a magnetic induction communication system 100 according to an embodiment of the present invention. The system communicates via the transmission and reception of the magnetic component of electromagnetic radiation that represents data communications signal information. System 100 includes one or more transceivers, such as transceivers 111a through 111n. Each transceiver 111a through 111n includes a magnetic transmission and receiving antenna device, such as 110a through 110n. In the exemplary embodiment of system 100, a plurality of transceivers 111a through 111n communicate with one-another via magnetic signals 125.

According to an embodiment of the present invention one or more transceivers 111a through 111n may be well suited for being carried by individuals engaged in a variety of communication activities ranging from business, industrial or military. For example, transceivers 111a through 111n may be well suited for communication by military personnel engaged in close combat situations.

Each transceiver 111a through 111n is connected to a wireless device chip set 115a through 115n to allow communication of the particular protocol chosen, (e.g., the Institute of Electrical and Electronics Engineers (IEEE) 802.11 Standard for Wireless Local Area Networks (802.11)). In the exemplary embodiment of system 100, transceiver 111a is equipped with appropriate hardware and/or software functionality to operate as a wireless access point or router 120 so as to connect via wireless communications the various devices (i.e. 111b, 111c, . . . 111n) together as well as enable communications through transceiver 111a with one or more computers 140a via a wired network.

In the exemplary embodiment of system 100, transceivers 111b through 111n are connected to wireless device chip sets 115b through 115n. In turn the wireless device chip sets 115b through 115n communicate with computers 140a though 140n for general computer processing or processing directly related to the communications system 100 (e.g., decoding received data). For example, in a chassis or other such cabinet containing a plurality of electronic modules or computer boards (represented as 140b, . . . , 140n), when a board or module (e.g. 140b) is placed in the cabinet and power is applied, the module is adapted to communicate via the corresponding chip set and magnetic transceiver WLAN network with other computer board modules (e.g. 140*n*) using the base transceiver 111*a* for routing the communications to the appropriate destination.

Figure 2:
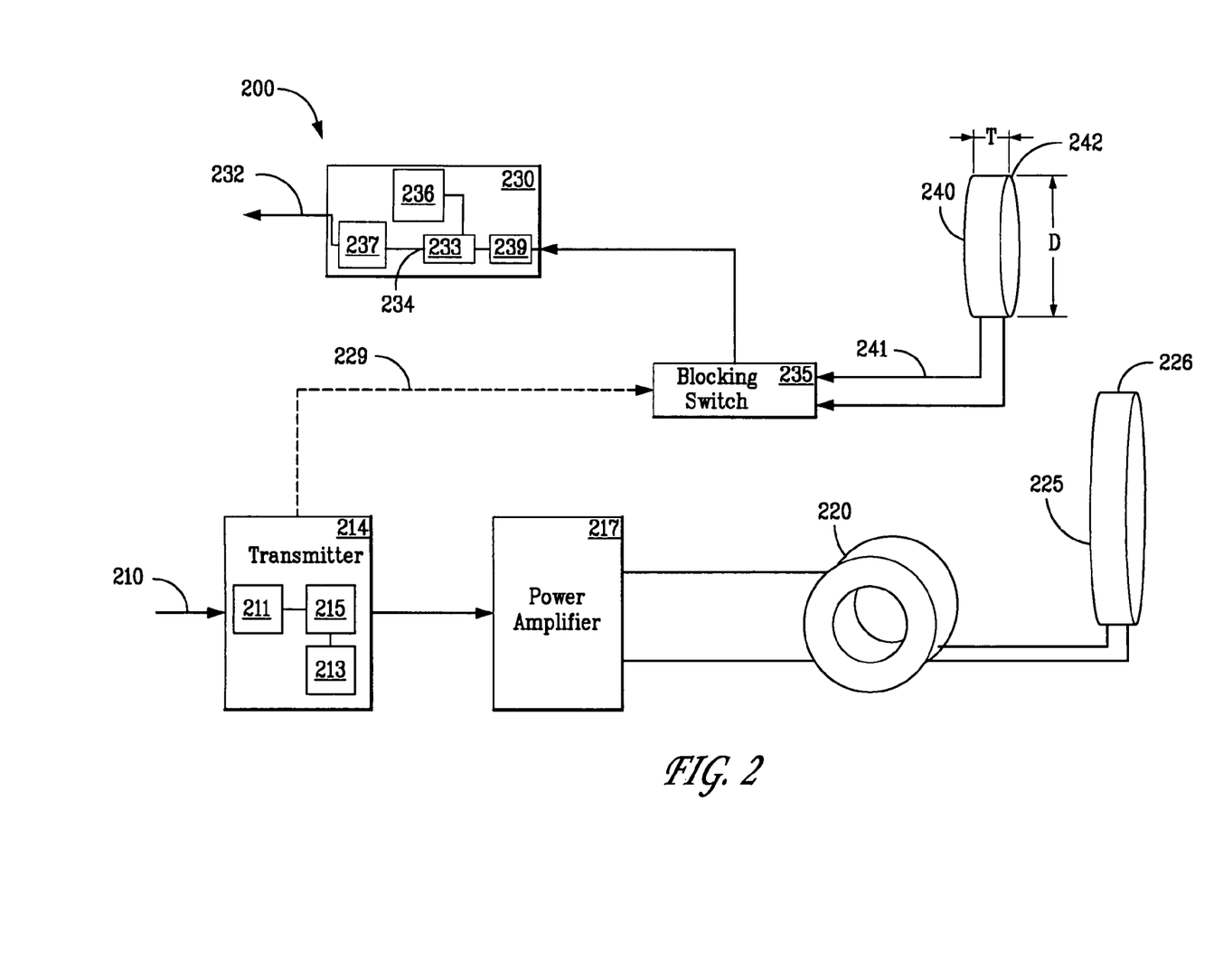
FIG. 2 illustrates a block diagram of a transmitter and receiver according to an embodiment of the invention.

Referring now to FIG. 2, there is shown a block diagram of a magnetic transmission/receiving system 200 having a transmitter 214 being suitable to a communicate a signal source 210 in the form of analog or digital data to a receiver 230 via the magnetic communication system. Transmitter 214 receives data 210 and conditions data in block 211 for transmission under the IEEE 802.11 protocol. A modulator 215 mixes the conditioned data with a carrier signal originating in block 213. The modulated signal is amplified via power amplifier 217. An impedance matching inductive coupler 220 may include one or more conventional impedance components for matching the impedance of an inductively coupled antenna 225 with amplifier 217. In the illustrated embodiment amplifier 217 signals are coupled to antenna 225 via an impedance matching coupler 220 transformer. The antenna 225 in one non limiting embodiment of the invention is comprised of a loop 226 of 1 inch diameter, 30 turns of 32 gauge wire. The larger the cross section of the transmit antenna 225 the greater the range. The more turns of wire on the transmit antenna 225 the greater the range. The greater the current in the transmit loop 226 (not power) the greater the range.

Blocking switch 235 receives a transmitter active signal 229 that disables the receiver 230 when the transmitter 214 is operating on the same frequency as the receiver 230. The blocking signal 229 may be connected to the blocking switch via a direct wire connection or may be connected via an RF or another magnetic transmission reception link. Blocking switch 235 may be any device that interrupts the reception of a received signal when the transmitter is transmitting. The receiver 230 may also be disabled during half-duplex communication on the same frequency.

Still referring to FIG. 2, a receiving antenna 240 in one non limiting embodiment of the invention comprises a loop 242 of 1 inch diameter and 60 turn 32 gauge wire. The receiving antenna 240 is typically an air coil and generates voltages based upon the magnetic energy that cuts across loop 242. The antenna 240 receives a signal transmitted from a magnetic antenna such as antenna 225. The more turns of wire on receive antenna 240 the greater the range between the antenna 240 and the transmitting antenna (such as magnetic antenna 225).

The blocking switch 235 passes the received signal if the blocking switch has not received a transmitter "active' signal 229 to disable reception under the condition as indicated above. The signal is passed to a receiver 230, which serves to demodulate, decode and filter noise in the incoming signal using techniques well known to those of ordinary skill in the electrical arts. In one embodiment a received analog signal 241 is fed into receiver demodulator 239. The demodulator may use frequency shift key (FSK) demodulation as well as other methods well known to those skilled in the art of wireless communications. The demodulated signal is digitized, as by way of example an analog to digital converter 233, to which is applied an 802.11 paradigm via decoder 236 to decode the demodulated signal to produce a digital signal 234. The digital signal 234 is filtered through a noise canceling device 237, such as may be embodied in a digital signal processor, to reduce the ambient electromagnetic noise, to produce the desired digital signal output 232. Noise cancellation devices and methods are well known to those skilled in the art of wireless communications.

Figure 3A:
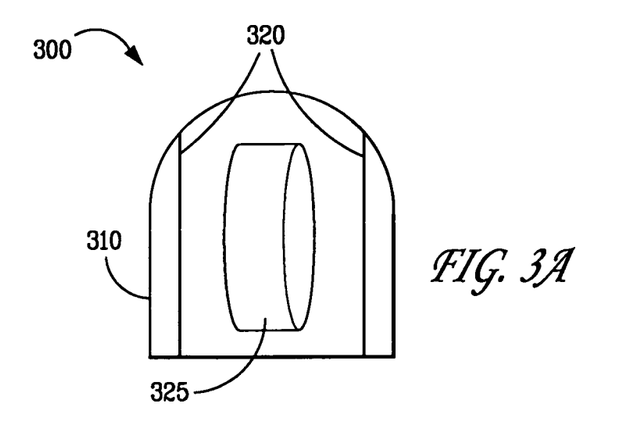
FIG. 3 illustrates a perspective view of a magnetic antenna according to an embodiment of the invention.
Figure 3B:
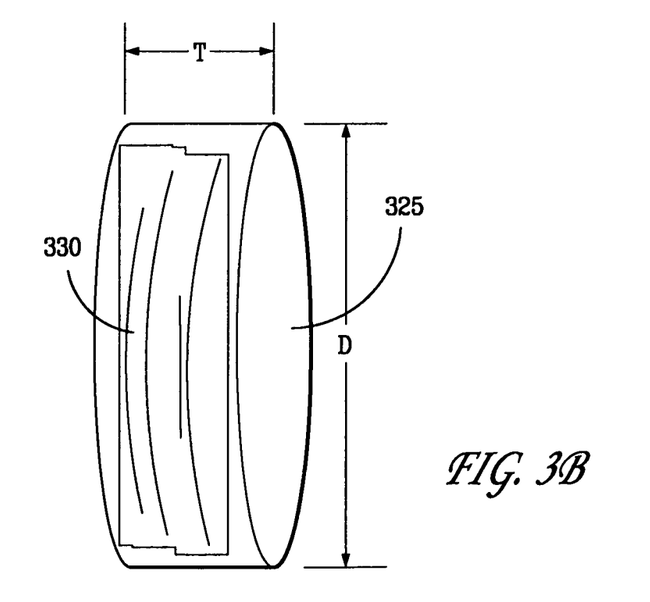

Referring now to FIG. 3*a* and FIG. 3*b*, there is shown a magnetic antenna 300 suitable to transmit or receive data as described in connection with FIGS. 1 and 2. The antenna 310 includes a coil 325 and a cage or enclosure 310 manufactured from a conductive material such as copper, brass, aluminum or steel. The enclosure contains two slits 320. The slits are sized such that, without the slits the enclosure would form a complete shield around the antenna coil 325. The slits are positioned on either side of the antenna so as to avoid shorting of the magnetic field. Preferably, the slits are configured to be as narrow as possible in order to minimize fringing of the electric field. Thus, by incorporating the slits 320 the electric field is captured and grounded, but the magnetic energy emanates through the shield for transmission or reception.

Referring to FIG. 3*b*, the antenna 300 includes windings 330. The thickness T of the antenna coil 325 in one non limiting embodiment is about one half (½) inch. The diameter D of the antenna coil 325, in one non limiting embodiment is about 1 inch. Simple non-metallic forms may be used for windings 330. The number of windings 330 in one non limiting embodiment is about 60 turns of 32 gauge wire. The receive antenna may be an air-core design due to the high frequencies involved.

Returning now to FIG. 2, in one embodiment the transmit antenna 225 and receive antenna 242 may each employ an electric shield 310 and slits 320 as shown in FIG. 3. In one non limiting embodiment of the invention each antenna 300 is about 1.5 inch wide×2 inch long×1.5 inch high.

Figure 4:
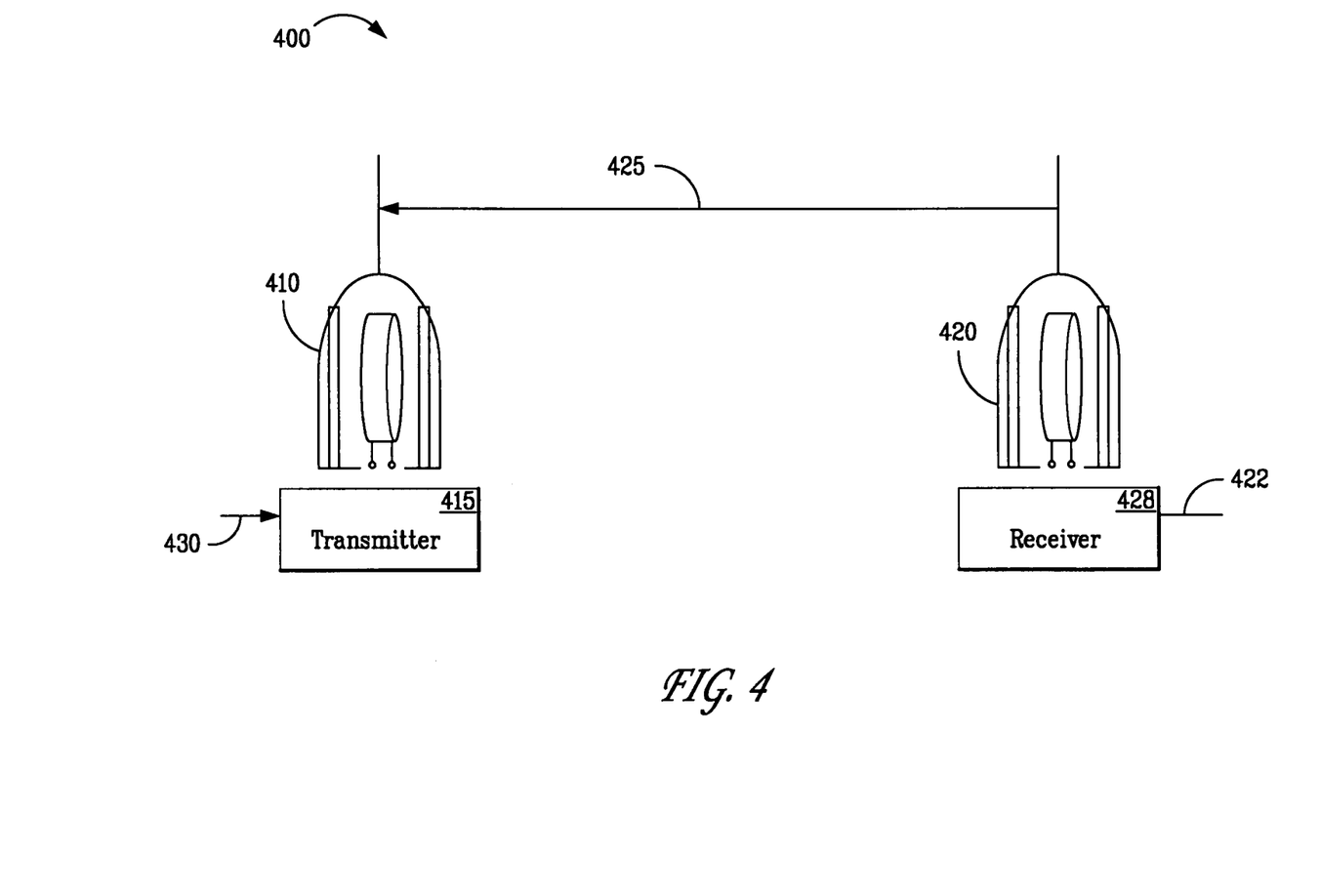
FIG. 4 illustrates a block diagram of a base transmitter and a remote receiver according to an embodiment of the invention.

Referring now to FIG. 4, there is shown a block diagram of a magnetic transmission/receiving system 400 having a transmitter 415 and associated magnetic antenna 410 being suitable to communicate data 430 to an appropriately configured receiver 428 and associated antenna 420, for providing data output 422 via the magnetic transmission system. The separation 425 between antenna 410 and associated antenna 420 is about one half (½) the carrier wavelength for near field operation. In one exemplary embodiment the separation is between about two and twenty meters. For example, at the higher end a nominal carrier frequency would be on the order of about 15 megahertz (MHz). In other applications such as a wireless backplane or chassis as further described below, the maximum separation distance would be the size of the inside of a backplane cabinet of an electronic chassis. In one non limiting embodiment of the invention the distance would be in the range of one to two meters. The receiving antenna 420 as indicated is typically an air coil and generates voltages based upon the magnetic energy that cuts across the wires. The receiver 428 therefore, generally should be a very high impedance amplifier having very low noise to receive and subsequently demodulate the received carrier signal.

Figure 5:
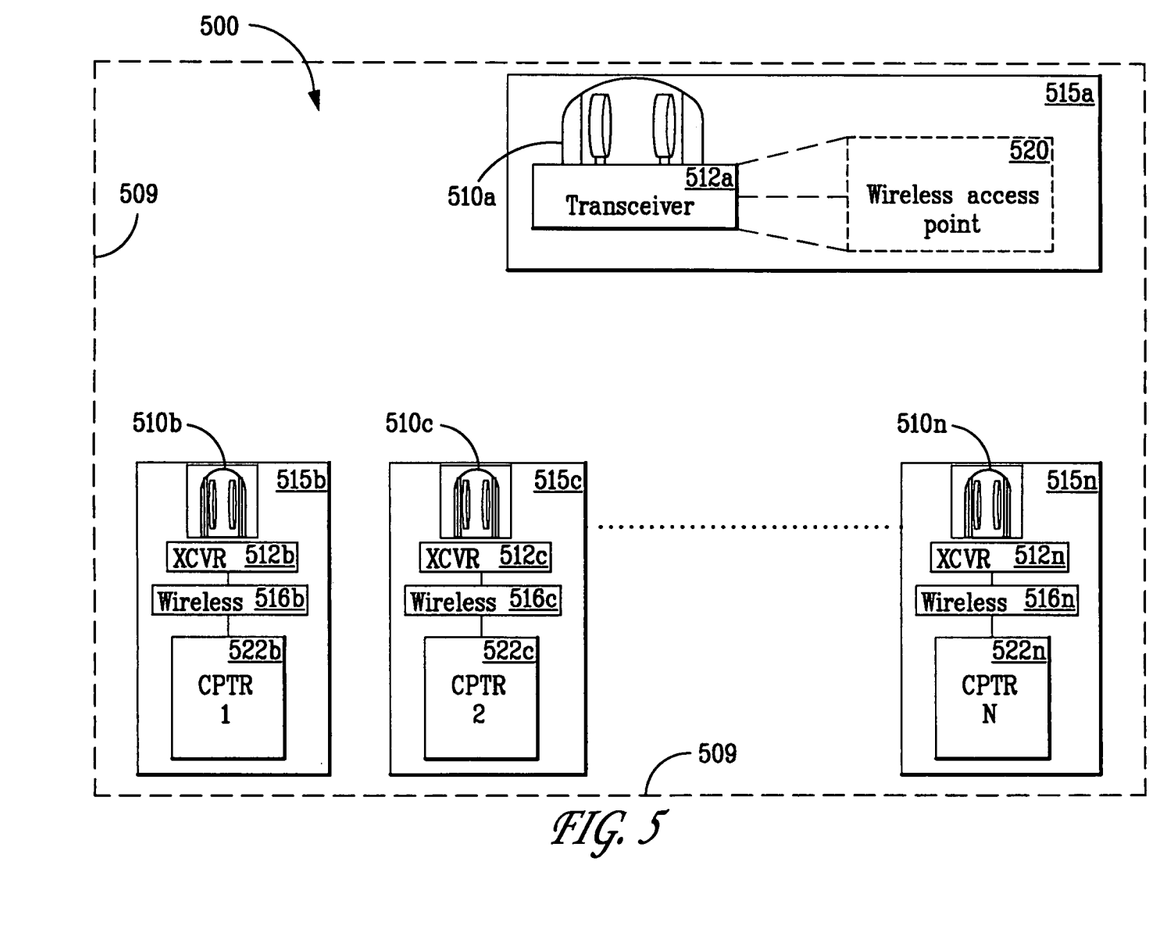
FIG. 5 illustrates a block diagram of a wireless chassis system according to an embodiment of the invention.

Referring now to FIG. 5, there is shown a diagram of a magnetic induction communication system 500 for supplying short range and secure magnetics based wireless LAN communicating within an enclosed subsystem or chassis such as an electronic cabinet. System 500 shows a wireless chassis system containing a plurality of portable or insertable/removable interdependent subsystems (e.g. computer cards) enclosed in a cabinet chassis 509. A base system 515*a* comprising transreceiver 512*a* and antenna 510*a* communicates with a group of satellite subsystems 515*b* through 515*n*, each having associated transceivers 512*b* through 512*n* and associated antennas 510*b* through 510*n*. Pluralities of subsystems such as 515*b* through 515*n* are also optionally coupled through their communication systems. In the exemplary embodiment of system 500, subsystems 515*b* through 515*n* include computers 522*b* through 522*n* that communicate with one-another via signals operating essentially as described in connection with the systems of FIGS. 1 and 2.

In the exemplary embodiment of system 500, transceiver 512*a* operates as a wireless access point or router 520 that connects transceivers 512b through 512n through wireless device chip sets 516(b) through 516 (n) to allow communication of the particular protocol chosen, (e.g., 802.11 style transmission techniques) which allow multiple units on the same channel to interdependently communicate between subsystems 515b through 515n.

System 500 may be used as a hot plug without an electrical interconnection outside the chassis 509. The base system 515a and subsystems 515b through 515n obtain necessary power and ground connection via a battery or other such power source. Transceivers 512b through 512n are programmed such that once power is established, a transceiver automatically establishes a communications connection with the base system. Likewise, once power is established the base system automatically establishes communication between itself and the satellite subsystem transceivers utilizing the wireless magnetic communication system described herein.

Those of ordinary skill in computer and communications technology will recognize that the wireless magnetic communication system described in connection with FIGS. 1, 2 and 5 may operate utilizing CDMA, TDMA, GPS, GPRS, Nextel, DECT, WiFi and Bluetooth technologies.

In the illustrated embodiment shown in FIG. 5, the various subsystems 515b through 515n each have associated processors as represented by computers 522b through 522n each computing device that includes a processor. These processors may incorporate the transceivers 512b through 512n as well as the various wireless chip sets 516b through 516n. A processor generally includes a Central Processing Unit (CPU), such as a microprocessor. A CPU generally includes an arithmetic logic unit (ALU), which performs arithmetic and logical operations, and a control unit, which extracts instructions (e.g., code) from memory and decodes and executes them, calling on the ALU when necessary. "Memory", as used herein, generally refers to one or more devices capable of storing data, such as in the form of chips, tapes, disks or drives. Memory may take the form of one or more random-access memory (RAM), read-only memory (ROM), programmable read-only memory (PROM), erasable programmable read-only memory (EPROM), or electrically erasable programmable read-only memory (EEPROM) chips, by way of further example only. Memory may take the form of internal or external disc drives, for example. Memory may be internal or external to an integrated unit including a processor. Memory preferably stores a computer program or code, e.g., a sequence of instructions being operable by a processor.

The processors may take the form of hardware, such as an Application Specific Integrated Circuit (ASIC) and or firmware, in addition or in lieu of incorporating a processor. A processor may include an encoder for encoding the data or information bearing signals according to one or more encoding techniques, as is known in the art, for subsequent modulation, transmission, reception, demodulation, decoding and processing. Such encoding techniques as multi-carrier modulation and convolution coding are suitable for application to the present invention.

Figure 6:
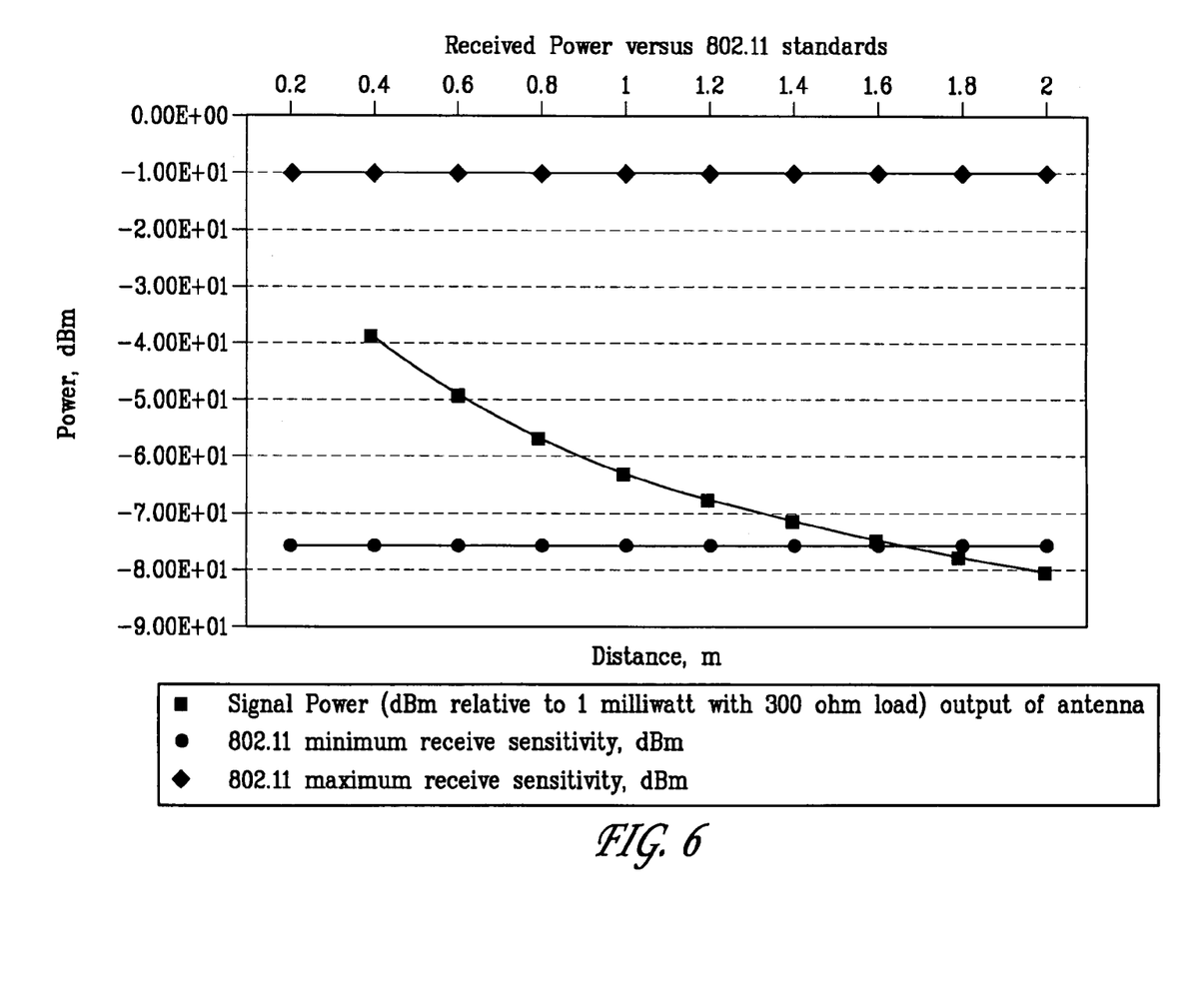
FIG. 6 illustrates an expected performance characteristic of a device and system according to embodiments of the present invention.

Using 802.11 as the standard for signal to noise reception, the receiver would require a relatively noiseless (e.g., −76 dBm) signal strength. FIG. 6 illustrates the range 1.6 meters can be achieved utilizing noise cancellation technology, as for example illustrated in FIG. 2, reference 237, where 35 dB to 40 dB is achievable.

Figure 7A:
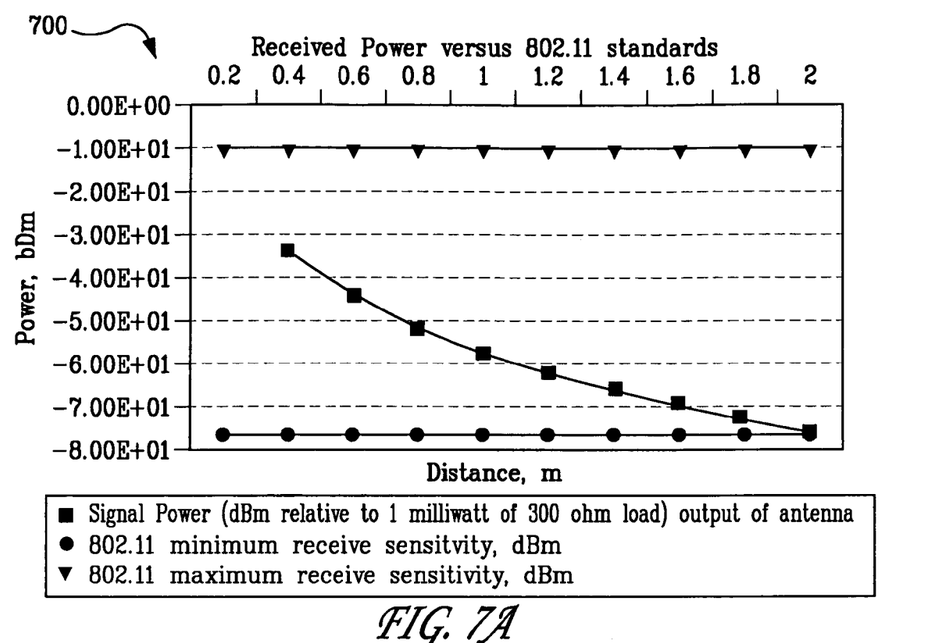
FIGS. 7a and 7b illustrate expected performance characteristics of devices and systems according to embodiments of the present invention.
Figure 7B:
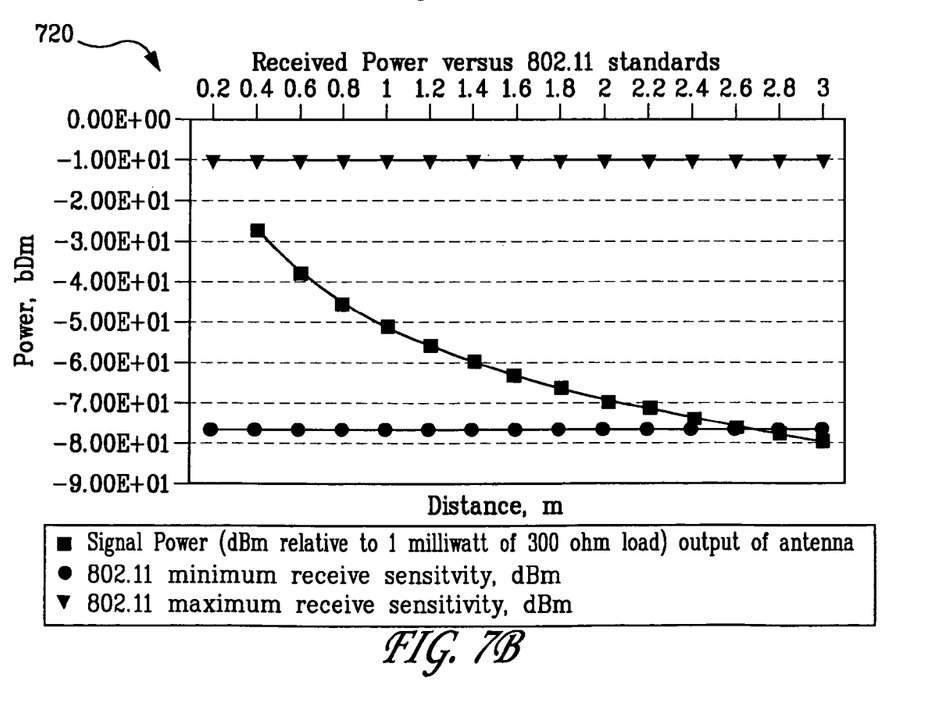

In conjunction with the exemplary embodiments of the invention depicted in FIGS. 1, 2 and 5, there is shown in FIG. 7a a graph 700 of expected performance characteristics for a transmit antenna loop current increased to 200 milliwatts and range to 2 meters. FIG. 7b graphically illustrates a transmit antenna loop current 720 increased to 200 milliwatts with wire turns on the receive antenna (as for example illustrated in FIG. 2, reference 242), increased to 120 and range to 2.6 meters.

Figure 8:
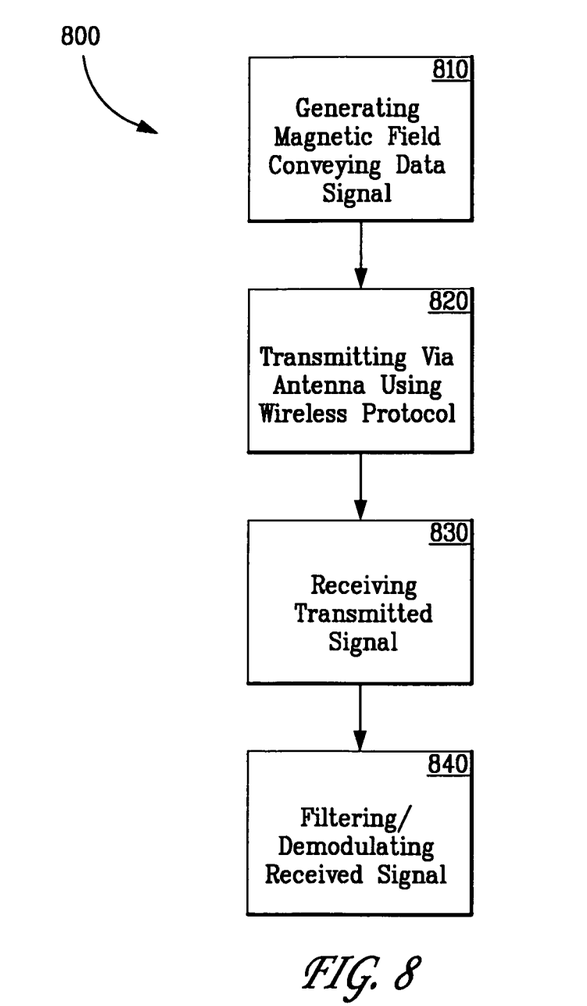
FIG. 8 illustrates a block diagram of a method for communication according to an embodiment of the invention.

As shown in the exemplary block diagram of FIG. 8, one embodiment of the invention is drawn to a method 800 for providing high speed data communications for short range wireless LAN applications using magnetic induction. The method includes providing within a chassis a plurality of electronic modules, wherein in a first one of the modules, a time varying magnetic signal is generated (810) indicative of a magnetic component of electromagnetic radiation carrying a data communications signal containing information for transmission. The magnetic communications signal is transmitted (820) via a magnetic antenna utilizing a wireless protocol. The transmitted signal is communicated over a short range and received (830) utilizing a magnetic antenna and corresponding receiver circuitry. The signal may be demodulated (840) using appropriate receiver circuitry to recover the information signal. The signal may be filtered to reduce any undesirable electromagnetic noise in the signal.

With reference to the system of FIG. 1, magnetic based wireless communications between transceivers 111b through 111n may be accomplished by communicating from base transceiver 111a operative as a router for routing information to the intended destination node such as subsystem transceivers 111b-111n. It is further understood that the system of the present invention operates with transceiver 111a as a wireless access point for communicating outside the WLAN to external devices and/or external computer networks via computer 140a, for example. The implementation of a short range wireless LAN communications system (as opposed to a point-to-point system) provides for a backplane implementation for electronic modules contained within a chassis on board a ship, aircraft, satellite or other vessel or facility, and that overcomes significant shortcomings associated with security, shielding, wiring, EMI and other communications issues affecting such systems.

In an exemplary embodiment, a carrier frequency of about 13 MHz may provide a near field range of about 10 meters. A data rate of about 1 Mbps may be implemented with a narrow band frequency modulation or other encoding method utilized to increase data throughput for a given carrier. The system may further implement adaptive noise cancellation within the receiver subunits in order to reduce (e.g. greater than 20 dB) ambient magnetic interference. Transceiver 111a may be adapted to include wireless device chipset 115a having a lower carrier frequency and data rate than standard RF implemented wireless chip sets. Still further, multiple carrier frequencies may be used, thereby creating separate channels (e.g. 13 MHz, 15 MHz, 17 MHz, etc.) of about 2 MHz spacing or channel separation for 1 Mbps data rates. Each transmit antenna may have a thickness of about one half inch and diameter of about 1 inch with non-metallic form used for windings. The number of windings may be 30 turns of 32 gauge wire. Omnidirectional operation may be implemented using two loops oriented at 90 degrees to each other and transmitting in phase. For the transmit antenna, 100 milli-amps (mA) current is typically applied via the transmitter driver circuitry to the antenna with a 1 V voltage used for power calculations to thereby produce 100 milliwatts (mW) power. The voltage used, however, is essentially immaterial other than for providing the overall power rating. It is also understood that applying a higher current to the transmit antenna will generally provide greater range. For the receive antenna, a thickness of the coil is about one half inch with a diameter of about 1 inch with non-metallic form used for windings. The number of windings may be 60 turns of 32 gauge wire. The receive antenna may be an air-core (as opposed to a ferrite core, for example) adapted for use at high frequencies (e.g. 10 MHz-20 MHz).

The wireless magnetic communications system as described herein is operative as a backplane for enabling communications of dynamically insertable and removable electronic modules (insertable/removable within in a chassis on board a ship, aircraft, or satellite, for example) within about 1 cubic meter of one another as is understood in the art, without requiring extensive shielding as necessary with RF backplanes. While the magnetic transmitter is operating receivers within range can receive information via the induced energy. Once the transmitter stops transmitting no further reception is possible. The magnetic fields exist only when the transmitter is active and do not propagate away from the antenna like RF energy. Furthermore, magnetic transmitters operating with about 100 mW power produce almost no EMI to impede convention electronic circuits such as those contained in chassis modules.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A system for transmitting and receiving magnetic signals within a wireless local access network (WLAN), comprising:
    a chassis configured to receive and provide power to a plurality of electronic modules;
    a transmitter in the chassis and having a signal source,
    a modulator coupled to the source,
    a power amplifier coupled to the modulator and a magnetic antenna inductively coupled to the power amplifier for transmission of magnetic signals;
    a receiver coupled to a magnetic antenna for receiving magnetic signals,
    a wireless communication device operatively connected to the transmitter and the receiver for connecting to the WLAN; and
    a plurality of electronic modules, each comprising a portable interdependent satellite magnetic transceiver configured to communicate with the wireless communication device via the WLAN;
    wherein the WLAN comprises a point-to-multipoint network, and the wireless communication device is configured to connect to the WLAN via a wireless router,
    wherein the plurality of portable interdependent satellite magnetic transceivers, the wireless communication device, the transmitter and the receiver are enclosed within the chassis, and
    wherein communication between the wireless communication device and the plurality of portable interdependent satellite magnetic transceivers is automatically established upon the mounting of the corresponding electronic module in the chassis and the application of power to the mounted electronic module.

2. The system of claim 1, further including a noise filter.

3. The system of claim 1, wherein the wireless communication device comprises one or more computers.

4. The system of claim 1, further including a blocking circuitry to disable reception of the signal when the transmitter is operating on the same frequency as the receiver.

5. The system of claim 1, further including a blocking signal.

6. The system of claim 1, wherein the transmitted magnetic signals have a nominal carrier frequency of less than or equal to 20 megahertz.

7. The system of claim 4, wherein the blocking signal is connected to the blocking circuitry by one of a direct wire connection, RF signal or magnetic induction.

8. A communications system comprising:
    a chassis configured to receive and provide power to a plurality of electronic modules;
    a plurality of electronic modules, each comprising:
        an interdependent transceiver in the chassis, each including:
        a data source,
        a modulator coupled to the source,
        a power amplifier coupled to the modulator,
        a magnetic antenna inductively coupled to the power amplifier for transmission of magnetic signals; and
        a wireless communication device operatively connected to the a corresponding interdependent transceiver; and
    a magnetic antenna for receiving magnetic signals coupled to a receiver for reception of data,
    wherein the plurality of wireless communication devices are configured to connect to a point-to-multipoint wireless local access network (WLAN) via a wireless router,
    wherein the plurality of wireless communication devices and the plurality of interdependent transceivers are enclosed within the chassis;
    wherein communication between the plurality of wireless communication devices is automatically established upon the mounting of the corresponding electronic module in the chassis and the application of power to the mounted electronic module.

9. The system of claim 8, wherein the transceiver further includes a transformer coupled between the power amplifier and magnetic antenna.

10. The system of claim 9, wherein the receiver further includes a demodulator to demodulate the received signals.

11. The system of claim 9, wherein the receiver further includes a noise filter.

12. The system of claim 9, wherein the receiver further includes a decoder to decode the demodulated signal.

13. A wireless local area network magnetic communications system comprising a plurality of electronic modules each comprising a portable interdependent satellite magnetic transceiver enclosed in a chassis, wherein a base system containing a magnetic transceiver operatively connected to a wireless router communicates with said satellite transceivers having associated antennas for transmitting and receiving magnetic signals via a wireless network protocol, and wherein communication between the wireless router of the base system and the plurality of portable interdependent satellite transceivers is automatically established upon the mounting of the corresponding electronic module in the chassis and the application of power to the mounted electronic module.

14. The system of claim 13, further comprising a corresponding computer module connected to each of said transceivers.

15. The system of claim 13, further including one or more wireless communication device chip sets for communicating with the wireless local area network via a predetermined protocol.

16. The system of claim 13, wherein the system is operative as a hot plug without an electrical network interconnection outside the chassis.

17. The system of claim 13, further including a power source.

18. The system of claim 13, further including a means for automatically establishing communications between the wireless router of the base system and the group of satellite transceivers.

19. The system of claim 13, further including a means for utilizing code or time division multiple access (CDMA/TDMA), a global positioning system (GPS), general packet radio service (GPRS), Nextel, digital enhanced cordless telecommunications (DECT), WiFi and Bluetooth technologies to communicate.

20. The system of claim 13, each transceiver including a magnetic antenna for transmitting or receiving magnetic signals carried by magnetic induction comprising a coil and a cage of a conductive material; and wherein said cage contains two slits such that the slits ground the electric field and permit the transmission or reception of magnetic field energy through the cage.

\* \* \* \* \*